United States Patent [19]
Han

[11] Patent Number: 6,098,393
[45] Date of Patent: Aug. 8, 2000

[54] HIGH STRENGTH STEEL CORD FOR PNEUMATIC TIRE

[75] Inventor: Yong Sig Han, Taejon, Rep. of Korea

[73] Assignee: Hankook Tire Company, Seoul, Rep. of Korea

[21] Appl. No.: 09/266,076

[22] Filed: Mar. 10, 1999

[30] Foreign Application Priority Data

Dec. 15, 1998 [KR] Rep. of Korea ...................... 98-54983

[51] Int. Cl.[7] ....................................................... D02G 3/02
[52] U.S. Cl. ................................ 57/902; 57/237; 152/527
[58] Field of Search ............................. 57/902, 237, 236, 57/200; 152/527

[56] References Cited

U.S. PATENT DOCUMENTS

| 5,213,652 | 5/1993 | Katoh et al. .............................. 57/200 |
| 5,293,737 | 3/1994 | Kobayashi et al. ........................ 57/236 |
| 5,337,549 | 8/1994 | Kobayashi et al. ........................ 57/236 |
| 5,505,243 | 4/1996 | Imamiya et al. ........................... 57/902 |
| 5,894,875 | 4/1999 | Masaki et al. ............................ 152/527 |

Primary Examiner—William Stryjewski
Attorney, Agent, or Firm—Michael N. Meller; Eugene Lieberstein

[57] ABSTRACT

The present invention relates to a high strength steel cord(1) for pneumatic tires, which is produced by the process of drawing high strength carbon steel with carbon content of 0.91~2.0% by weight, plating brass on the surface of the carbon steel so that it adheres to the rubber and repeating the drawing and stranding of said carbon steel. In particular, as the steel cord is composed of a filament of two strips, the steel cord according to the present invention is of a higher strength than conventional steel cord, and therefore when it is applied to a tire, the amount of steel cord and rubber topping used can be reduced, thereby resulting in a lighter weight tire, cost savings and lower fuel consumption rate.

5 Claims, 1 Drawing Sheet

HIGH STRENGTH STEEL CORD FOR PNEUMATIC TIRE

TECHNICAL FIELD

The present invention relates to a steel cord which is a component material of a steel belt used in pneumatic tires, more particularly to a steel cord for pneumatic tires which can lighten the weight of a tire, and reduce costs and fuel consumption rate through maintaining or improving the function of the steel cord, and simultaneously reducing the amounts of cord and rubber topping used.

BACKGROUND ART

Typically, a steel belt for a pneumatic tire means a belt formed by steel cord of several twisted filaments on which a layer of thin rubber is overlaid. In general, steel cord is produced through the process of drawing carbon steel with a carbon content of 0.70~0.82% by weight, plating brass on the surface of the carbon steel so that it adheres to the rubber and then drawing again and stranding said carbon steel by various methods.

The use of carbon steel with carbon content of more than 0.70~0.82% by weight results in high strength. However, many problems have arisen with respect to manufacturing wire rod for steel cord because if the content of carbon is increased, then when manufacturing wire rod, it is difficult to control carbon segregation and the distribution or the size etc. of the nonmetallic inclusions; moreover, if there is much carbon segregation or the size of nonmetallic inclusions is not well controlled in the carbon steel, when manufacturing wire rod for steel cord, then these cause manufacturing defects, such as the problem of cutting during drawing, since it is hard to endure the heavy drawing process during the production of steel cord for tires, and accordingly the production of steel cord is difficult.

U.S. Pat. No. 5,061,557 discloses a cord of two twisted filaments made from steel with a carbon content of 0.70~0.90% by weight. Even though the strength of the cord can be increased partly by appling steel with a carbon content of 0.80~0.90% by weight, it is not enough yet.

SUMMARY OF INVENTION

Nowadays it is possible to produce and draw wire rod, which contains much more than the above carbon content in carbon steel because there have been drastic development in the technology of metal refining and drawing recently. However a high strength carbon steel with more than the above carbon content has not yet been used in tires. Therefore it is difficult to reduce the necessary weight of steel cord in tires or to improve the performance of tires.

It is the object of the present invention to provide a high strength steel cord with high carbon content, which results a lighter tire, cost savings and lower fuel consumption rate as well as maintenance or enhancement of the original function and a lighter steel belt.

The present invention, to accomplish the above object, provides a steel cord for pneumatic tires composed of filaments of two strips which is produced through the process of drawing carbon steel, plating brass on the surface of said carbon steel and then drawing and stranding said carbon steel again, which is characterized in that the steel cord(1) is formed by twisting filaments(1a) of two strips; the diameter of each filament(1a) is 0.15 to 0.40 mm; the twisting pitch(lay length) is in the range of 10 to 70 times the diameter of the filament(1a); and the content of carbon in the carbon steel for steel cord(1) is 0.91 to 2.0% by weight.

BRIEF DESCRIPTION OF THE DRAWINGS

The invention will now be illustrated in detail with reference to the accompanying drawings.

DETAILED DESCRIPTION OF THE INVENTION

Figure 1:
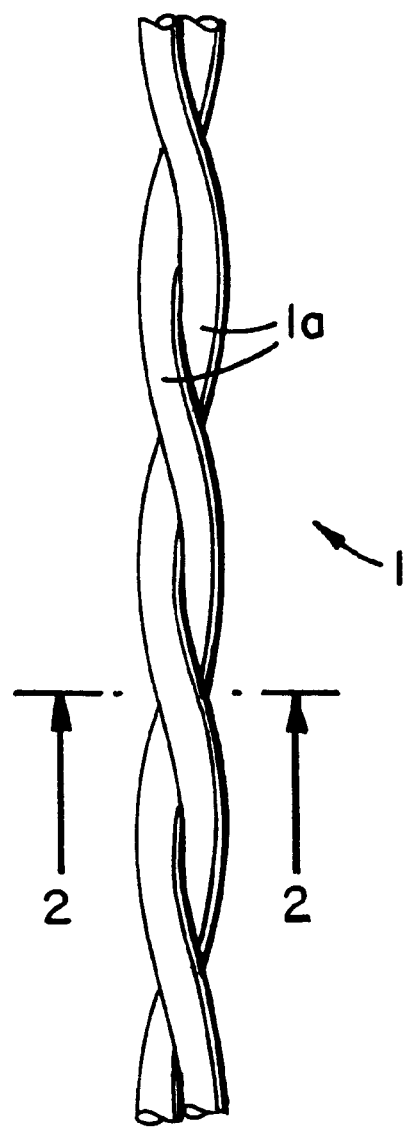
FIG. 1 is a plane view of a 1×2 steel cord according to the present invention.
Figure 2:
FIG. 2 is a cross-sectional view of steel cord in FIG. 1 taken along lines I—I.

According to the present invention, the 1×2 steel cord(1) is of high strength, in that each filament(1a) used in said cord has a diameter of 0.15~4.0 mm, said cord has a twist pitch(lay length) of 10~70 times the filament(1a) diameter, and the tensile strength of the filament prior to stranding into steel cord(1) is above 340 Kgf/m$^2$.

Herein, the 1×2 steel cord means a cord formed by twisting the filament of two strips together in a constant direction at the same twist pitch(lay length), and said steel cord is formed such that the stress level of fatigue limit of the 1×2 steel cord(1) upon completely reserved cycle of stress fatigue test is above 90 Kgf/mm$^2$, the elasticity of the steel cord(1) based on the loop test is above 90% and the elongation of the steel cord(1) in the low load range(0.2~1.6 Kgf) is below 0.10% so as to easily achieve the rubber topping.

In order to achieve suitable reinforcement, lower weight and cost savings when the 1×2 steel cord is applied to the steel belt of a tire, it is formed to satisfy the following equation formula and supposing the diameter of the filament of the steel cord is indicated as d(mm), the number of strips of steel cord per inch at the time of carrying out the rubber topping is indicated as n, and the thickness of the rubber topping is indicated as t(mm), then the equation thereof is as follows:

$$n \geq 1.35/d^2 \quad t=(2d+0.2)\sim(2d+2)$$

The comparison between the steel cord according to the present invention and the prior art is shown in the following Table 1. The data of the present invention shown in Table 1 represents the physical properties of the steel cord in which carbon steel wire rod with the carbon content of 0.93% by weight is used, a filament(1a) of a diameter of 0.30 mm is applied and brass is plated on the surface of the filament(1a). Furthermore, among the items of Table 1, the numerals of the parentheses in the rubber adhesion force section represent the rubber coverage by percentage of samples of which the rubber adhesion has been tested.

Therefore, the steel cord according to the present invention can result in a lighter tire, cost savings and lower fuel consumption rate, since said steel cord has sufficient strength with smaller quantity than that of conventional steel cord.

TABLE 1

| Items | Prior Art (2 + 2) | Present Invention (1 × 2) |
|---|---|---|
| Plating characteristics | | |
| plating material (Cu, Zn (wt %)) | 63.7, 36.3 | 63.1, 36.9 |
| plating thickness (μm) | 0.25 | 0.24 |
| Mechanical properties | | |
| lay length (mm) | 14.0 | 12.0 |
| lay direction | right | right |

TABLE 1-continued

| Items | Prior Art (2 + 2) | Present Invention (1 × 2) |
|---|---|---|
| diameter of filament (mm) | 0.25 | 0.30 |
| diameter of steel cord (mm) | 0.66 | 0.61 |
| breaking force (kgf) | 62 | 51 |
| elongation at break (%) | 2.5 | 2.4 |
| low load elongation (%) (0.2~1.6 kgf) | 0.047 | 0.054 |
| linear density(g/m) | 1.56 | 1.12 |
| elasticity (%) | 96 | 97 |
| stiffness (g-cm/a steel cord) (TABER stiffness tester) | 33 | 30 |
| RBT fatigue test Rotating beam fatigue tester) | | |
| stress (90 kgf/mm²) | more than 1 million cycles | more than 1 million cycles |
| stress (100 kgf/mm²) | | more than 1 million cycles |
| Rubber adhesion force (kgf/0.5 inch (ASTM method) | | |
| initial (curing 160° C. × 20 min) | 58(100) | 50(100) |
| heat aging (100° C.) | | |
| 4 days | 56(95) | 51(95) |
| 8 days | 51(90) | 47(90) |
| 12 days | 49(90) | 44(90) |
| humidity condition (70° C. × 96% R/H) | | |
| 4 days | 58(95) | 47(90) |
| 8 days | 53(90) | 40(90) |
| 12 days | 46(85) | 36(85) |
| hot water condition (70° C.) | | |
| 4 days | 54(90) | 39(90) |
| 8 days | 54(90) | 36(80) |
| 12 days | 47(85) | 32(80) |
| salinity condition (20% NaCl) | | |
| 4 days | 57(80) | 50(85) |
| 8 days | 53(80) | 49(80) |
| 12 days | 49(75) | 44(80) |

As described above, the present invention can reduce the weight of a tire and reduce the cost through use of a steel belt composed of high strength carbon steel and reduce the fuel consumption rate owing to lower rolling resistance of a tire.

What is claimed is:

1. A steel cord for pneumatic tires composed of filaments of two strips which is produced through the process of drawing carbon steel, plating brass on the surface of said carbon steel and then drawing and stranding said carbon steel again, characterized in that the steel cord(1) is formed by twisting filaments(1a) of two strips; the diameter of each filament(1a) is 0.15 to 0.40 mm; the twisting pitch(lay length) is in the range of 10 to 70 times the diameter of the filament(1a); and the content of carbon in the carbon steel for steel cord(1) is 0.91 to 2.0% by weight.

2. The steel cord of claim 1, wherein the respective tensile strength level of the filament(1a) prior to stranding into steel cord(1) is above 340 kgf/mm².

3. The steel cord of claim 1, wherein the steel cord(1) has the characteristics that the elongation of the low load is below 0.10% in the range of 0.2~1.6 kgf of load, the elasticity based on the loop test is above 90%, and the stress level of fatigue limit is above 90 kgf/mm² upon completely reserved cycle of stress fatigue test.

4. The steel cord of claim 1, wherein the steel cord(1) is manufactured to satisfy the following equation in which the diameter of the filament of the steel cord is indicated as d(mm), the number of strips of steel cord per inch at the time of carrying out the rubber topping is indicated as n, and the thickness of the rubber topping is indicated as t(mm).

$$n \geq 1.35/d^2 \quad t=(2d+0.2)\sim(2d+2)$$

5. A pneumatic tire using a steel cord described in claim 1.

* * * * *